Sept. 20, 1927.

A. HUWILER 1,642,957

CLUTCH ACTUATED BY LIQUID UNDER PRESSURE

Filed Dec. 19, 1925

Inventor:
Anton Huwiler
by *Bloch*
attorney.

Patented Sept. 20, 1927.

1,642,957

UNITED STATES PATENT OFFICE.

ANTON HUWILER, OF BASEL, SWITZERLAND.

CLUTCH ACTUATED BY LIQUID UNDER PRESSURE.

Application filed December 19, 1925, Serial No. 76,435, and in Switzerland December 19, 1924.

The present invention relates to a clutch which is actuated by liquid under pressure and which is preferably employed in connection with change-speed and reversing gears. The working of the apparatus is based upon a pressure chamber surrounding the driving shaft, liquid under pressure being supplied to and withdrawn from the said chamber. The pressure chamber can expand in a radial direction owing to the pressure of the liquid supplied and by this means the walls of the chamber are pressed against the internal surface of a drum or the like surrounding the chamber, as a result of which the clutch is closed. This drum may be constructed as a toothed wheel or in some other way may carry a gear connected with the shaft to be driven. It may alternatively however be mounted fast to the shaft to be driven or arranged in any other convenient manner. Preferably the pressure chamber is constructed as a cylinder, the periphery of which consists of a plurality of parts which can execute a radial movement independently of one another without the fluid tightness of the joints between the said parts or between them and the end walls being impaired.

The opening of the clutch is effected by allowing the pressure liquid to escape from the chamber or connecting the chamber with a chamber in which there is no pressure. In connection with the known clutches of this type the opening of the clutch is difficult in consequence of the friction existing between the parts of the clutch after the escapement of the pressure liquid. For the purpose of avoiding this drawback and of positively drawing the walls of the pressure chamber away from the drum according to the invention suitably arranged counter-weights are employed, the centrifugal force of which exceeds that of the said walls.

Figure 1:
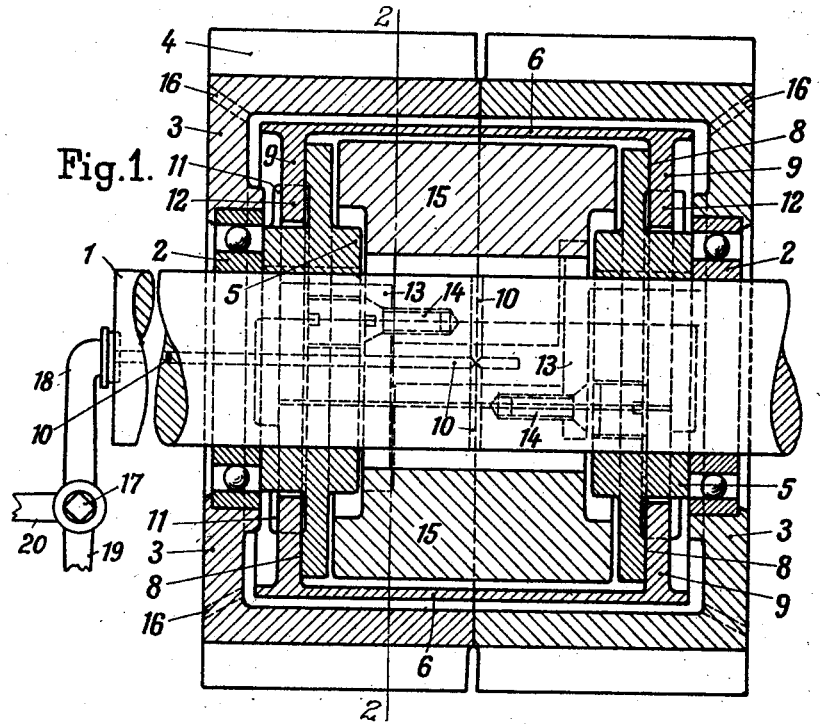
Figure 2:
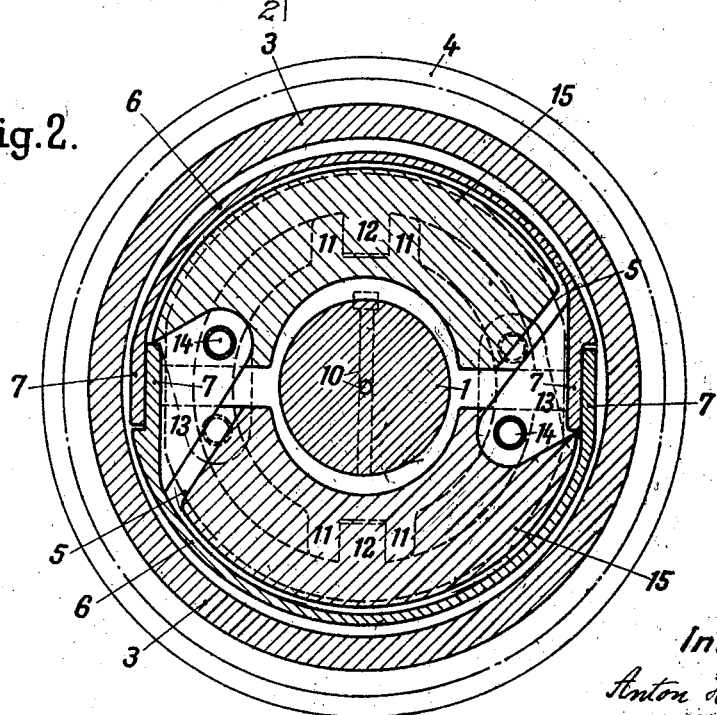

The accompanying drawing shows by way of example one constructional form of the invention. In this drawing Fig. 1 is a longitudinal section through the clutch in an open condition and Fig. 2 is a cross-section through Fig. 1 in the direction of line 2—2 in Fig. 1.

On a shaft 1 being for instance the driving shaft is supported, by means of ball bearings 2 a hollow disc or drum 3, forming the driven shaft or being connected therewith. To the periphery thereof are fitted teeth 4 in order to enable power to be transmitted to another shaft by means of a second toothed wheel, not here indicated. In the hollow disc or drum 3, consisting of two parts capable of being united to one another there are two discs 5 which are keyed fast to the shaft 1. The cylindrical walls of the pressure chamber are formed by two casing members 6. They constitute with the discs 5, a chamber closed on all sides. Now the casing members 6 are displaceable in a radial direction and can accordingly either bear against the internal cylindrical surfaces of the hollow disc or drum 3 or move away from them. Each of the cylindrical casing members 6 embraces half the periphery of the pressure chamber. The joints between the casing members are rendered fluid-tight by the overlapping parts 7, this arrangement permitting of the necessary movability of the casing members. The packing of the casing members 6 in relation to the discs 5 firmly keyed on to the shaft is effected by the sliding surfaces 8, which are ground fluid-tight and which are fitted both on to these discs and on to the annular flaps or flanges 9. This packing construction also permits of the necessary radial displacement of the casing members 6. Through a passage 10 drilled in the shaft 1 pressure liquid can be admitted to or withdrawn from the pressure chamber. In the former case the two casing members will press against the inner walls of the hollow disc and carry it round with them. For the guiding and driving of the cylindrical casing members themselves slide-ways 11 are arranged on the fast discs 5. In these slide-ways engage the cams or projections 12, belonging to the casing members 6. This construction also permits of the necessary radial displacement for closing and opening the clutch. In order that the cylindrical casing members 6 may become released from the hollow disc 3 when unclutched, a counter-weight 15 is provided for each casing member 6. The said casing members 6 are provided with lugs 13 on opposite sides, said lugs being connected by screws 14 with the counter-weights 15 in such a manner that each casing member 6 is rigidly connected with the counter-weight positioned diametrically opposite and that the centrifugal forces produced by a casing member and its counter-weight respectively act in opposite directions. The centrifugal force of the counter-weights is greater than that of the casing members 6, as soon therefore as the pressure chamber is no longer pressure the cylindrical casing members are drawn back by the centrifugal force of the counter-weights. In order that any pressure liquid leaking through may not reach the frictional surface, holes 16 are drilled in the hollow disc to allow the leakage liquid to escape.

The pressure-liquid passage 10 is connected with a cock 17, by means of a pipe 18 engaging fluid-tight the end of the shaft 1. The cock 17 connects according to its position the liquid passage by a pipe 19 with a supply of pressure liquid or by a pipe 20 with a space free from pressure. The closing and opening of the clutch is therefore effected by suitably adjusting the cock.

Having now particularly described and ascertained the nature of my said invention and in what manner the same is to be performed, I declare that what I claim is:

1. A clutch actuated by liquid under pressure comprising in combination a driving and a driven element a pressure chamber connected with one of said elements and rotating with it and having radially movable members, a hollow body connected with the other element, means adapted to allow a pressure liquid to enter said pressure chamber or to escape from it thereby moving said movable members into and allowing them to come out of engagement with said hollow body respectively and counter-weights operatively connected with said movable members and rotating with them, the centrifugal effect of said counter-weights being opposed to, and greater than, that of said members, thereby tending to draw the members away from said hollow body.

2. A clutch actuated by liquid under pressure comprising in combination a driving and a driven element a pressure chamber connected with one of said elements and rotating with it and having radially movable members, a hollow body connected with the other element, means adapted to allow a pressure liquid to enter said pressure chamber or to escape from it thereby moving said movable members into and allowing them to come out of engagement with said hollow body respectively and counter-weights, each being rigidly connected with the respective movable member positioned diametrically opposite, rotating with it, the centrifugal effect of each counter-weight being opposed to, and greater than that of the respective member thereby tending to draw the member away from said hollow body.

In testimony whereof I have affixed my signature.

ANTON HUWILER.